3,365,525
PROCESS FOR PRECIPITATING POLYMERS
FROM SOLUTION
Bruno Otto Gottfried Schueler, Wilmington, Del., assignor to E. I. du Pont de Nemours and Company, Wilmington, Del., a corporation of Delaware
No Drawing. Filed Dec. 16, 1964, Ser. No. 418,914
4 Claims. (Cl. 264—141)

ABSTRACT OF THE DISCLOSURE

Crystalline polymers are crystallized from a 10 to 50 weight percent solution of the polymer and recovered from the mother liquor by a process in which the polymer solution is extruded into a liquid coolant moving at a flow rate of from 1 to 4 times the flow rate of the extruded polymer solution to allow crystallization of the polymer into thin filaments. The liquid coolant carrying the polymer filaments is then agitated, causing the filaments to disintegrate to form a slurry of crystallized polymer particles which are then filtered from the mother liquor and coolant.

This invention relates to a novel method for precipitating polymers from solution and, more particularly, to a continuous process for precipitating crystalline polymers of 1-olefins from solution in a form adapted to removal of the precipitate from the mother liquor by filtration or centrifugation.

In the production of polyolefins solution technology is frequently employed. In particular, in the production of partially crystalline, isotactic polypropylene, and like stereoregular polymers of 1-olefins, solution technology may be employed in the polymerization process itself; for the separation of highly crystalline stereoregular polymers from the more soluble amorphous or atactic polymers, and from other forms such as syndiotactic polymers, or stereoblock polymers i.e. polymers containing substantial sequences of like stereoregular units in the chain together with substantial irregular sequences of units; and also for the separation of the polymers from solid particles of catalyst. The separation of the catalyst may be conducted by dissolving the polymer, agglomerating the catalyst, and separating the polymer solution from the catalyst by filtration; or alternatively substances may be added to solubilize the catalyst. In the event that the catalyst solubilization technique is employed, it is preferable to dissolve the polymer in a solvent in order to ensure that no catalyst residues are occluded by the solid polymer, and are therefore inaccessible to the solubilizing agent.

In the above and like processes polymer solutions are produced, and in order to recover the polymer in the solid state it is necessary to precipitate the polymer from solution. Inasmuch as solid thermoplastics generally dissolve in solvents only at elevated temperatures, precipitation is conveniently accomplished by cooling the solution. In commercial processes, however, it is necessary that the precipitate should be readily separable from the mother liquor, and this condition is difficult to achieve with polymer solutions.

Experimentation has shown that increasing the concentration of the polymer solution leads to more compact and more readily separable polymer particles when the solution is cooled below the precipitation temperature. It has also been discovered that slow cooling leads to the formation of larger precipitated particles from polymer solutions. It has further been discovered that shearing the polymer solutions even at temperatures substantially above the precipitation temperature leads to a change in the character of the precipitate, which tends to be fibrous in character rather than granular after such shearing. For example, crystalline isotactic polypropylene is precipitated from hydrocarbon solvents such as n-decane at about 85° C. When solutions of isotactic polypropylene in n-decane are agitated at 130° C. and the solution is subsequently cooled to below 85° C., without further shearing, the precipitate is fibrous and difficult to handle. Similar results are obtained if the solution is agitated during the precipitation process. On the other hand agitation of a polypropylene solution at temperatures above about 140° C. does not affect the character of the precipitate formed by subsequent cooling of the solution in the absence of shear forces.

The conditions necessary to obtain polymer precipitate of high filterability can be met by cooling the polymer solution, in a stagnant condition, in suitable vessels. However, while this is an excellent technique for use in the laboratory, it is too slow and costly for use in the commercial manufacture of polymers.

It has now been discovered that it is possible to provide a continuous process for the precipitation of polymer from solution, which is suitable for commercial operation, and which satisfies the above conditions for obtaining the precipitated polymer in a readily filterable granular form. This process comprises extruding a solution, of the selected polymer, at a temperature above the solution temperature dissolved in a suitable solvent to form a solution having a concentration in the range between 10 and 50% by weight and having a viscosity of at least 2,000 centipoises and preferably at least 20,000 centipoises, in the form of strands, into a stream of a liquid coolant, the coolant flowing cocurrently with the polymer-containing strands at a linear velocity from about 1 to about 4 times the linear extrusion velocity of the polymer solution and having a temperature below the precipitation temperature. Under these conditions, the extrudate does not disperse into the coolant system but remains as a coherent strand which is carried along in the coolant stream in a more or less extended form. The strand is permitted to flow in contact with the coolant until precipitation is substantially complete and is then disintegrated, preferably by a mechanical disintegrator, and the polymer is recovered from the resultant slurry of solid olefin polymer particles by filtration, centrifugation or the like.

By solution temperature is meant the temperature at which substantially all of the polymer dissolves in the selected solvent to give a solution of the selected concentration. This temperature can be determined by making a slurry of the finely divided polymer in the appropriate amount of solvent (e.g. by cooling a portion of the solution), heating the slurry to a temperature somewhat below the solution temperature, then raising the temperature by small increments allowing ahe mixture to come to equilibrium before each increment, until substantially all of the polymer has dissolved. A more convenient method for determining the solution temperature is to employ differential thermal analysis (D.T.A.). A commercial differential thermal analyser should be employed. A capillary tube having an internal diameter of about 1 mm. is employed to contain a suspension of the finely divided polymer in the solvent. The D.T.A. curve is obtained by heating at a rate of about 15° C. per minute. A peak on the chart which is roughly triangular in appearance is obtained due to the heat of solution of the polymer. The solution temperature is taken as the temperature on the chart at which a straight line drawn along the high temperature side of the peak intersects the interpolated base line.

The precipitation temperature may likewise be determined by slowly cooling a solution of the polymer until substantially all of the polymer is precipitated, but is preferably determined by differential thermal analysis. The same arrangement is employed as for measuring the solution temperature. In this case the temperature is decreased at a rate of about 15° C. per minute. A substantially triangular peak is obtained corresponding to the heat of solution evolved by the polymer upon precipitation, and the precipitation temperature is taken as the temperature on the chart at which a line drawn through the low temperature side of the DTA peak intersects the interpolated base line.

It will be realized that the solution temperature and precipitation temperature of a given polymer may be determined in a single DTA experiment in which the mixture is first heated to form a solution, then cooled.

The solution temperature and the precipitation temperature for a given polymer-solvent system are not the same, and indeed differ widely. Thus in one instance the solution temperature of a 22.5% by weight solution of an isotactic polypropylene in n-hexadecane was determined to be 138° C., and the precipitation temperature to be 66° C. The precipitation and solution temperatures depend on the nature of the polymer, the solvent employed, the concentration of the solution, the presence or absence of nucleating agents, and the like.

The viscosity of the polymer solution is determined at a temperature above the solution temperature and at low shear rates. This viscosity can be measured by the time taken for a bubble to rise a given distance in an upright column of the polymer solution or by the use of an extrusion plastometer such as the instrument described in ASTM specification D–1238–62T.

The solvents which can be employed in the practice of this invention are any solvents which will dissolve the polymer in the desired concentration. In the case of polyolefins suitable solvents are hydrocarbons, preferably being from 6–20 carbon atoms such as n-hexane, cyclohexane, methyl cyclohexane, n-decane, n-undecane, n-octadecane, benzene, toluene, xylene, tetrahydronaphthalane, decahydronaphthalene, and chlorinated hydrocarbons such as chlorobenzene or α-chloronaphthalene.

Mixtures of solvents can be employed, and additives to retain catalyst residues in solutions such as aliphatic alcohols including diols and diol monoethers preferably having from 3 to 8 carbon atoms, acetonyl acetone and like β-diketones can likewise be employed. A mixture of a hydrocarbon having from 6–10 carbon atoms together with from 30 to 65 mole % of an aliphatic alcohol is particularly effective for removing catalyst residues from the polymer during the precipitation process.

The coolant liquid can be any low viscosity liquid, and may be miscible or immiscible with the solvent employed to make the polymer solutions. In some arrangements of the apparatus, such as in the case where the polymer solution is extruded vertically upwards or vertically downwards, the density of the coolant should be substantially the same as the density of the extruded strands in order to avoid shearing forces due to flotation of the strands in a more dense coolant in the case of upwards extrusion, or of gravitational forces on the strand in the case of downwards extrusion of the solution into a coolant of lower density. Conversely in the case of upwards extrusion into a less dense coolant, the strands will tend to pile up above the extrusion heads, or in the case of extrusion downwards into a more dense coolant, a similar piling up will occur which may impair the operability of the process. For this reason, and also to obviate the difficulty of recovering mixtures of solvents, it is preferred to employ as coolant the same liquid employed as solvent. The linear velocity of extrusion of the polymer solution is calculated from the feed rate and the dimensions of the extrusion orifice. Similarly the velocity of the coolant in the column is calculated from the cross-sectional area and the feed rate.

The essence of the present invention is the use of a liquid "container" in which the concentrated polymer solution can cool in an essentially stagnant condition while being transported in accordance with the requirements of a continuous process. Ideally the linear velocity of extrusion of the solution and the linear flow of the coolant should be equal. However, better control of the ribbon can be achieved if the linear velocity of the coolant is from about 1 to about 4 times greater than the linear velocity of extrusion as defined hereinabove.

When the extrudate emerges from the extrusion orifice, it is a viscous liquid, and if the velocity of the coolant is substantially greater than that of the ribbon, it will be drawn down to a lesser cross-sectional area and achieve a greater linear velocity. The process is thus self regulating to some extent. Such drawdown is, however, undesirable, since it introduces shear into the polymer solution as the crystallization process commences. After the extrudate has travelled a short distance from the extrusion orifice, generally about 1–2 ft., precipitation causes the ribbon to assume a quasi solid state in which further drawdown takes place only with difficulty. The flow conditions are therefore of greatest importance in the vicinity of the extrusion orifice.

An apparatus which can be employed in the practice of this invention comprises an extrusion head for the extrusion of the polymer solution within a pipe having a diameter substantially greater than the greatest cross-sectional dimension of the polymer strands. The linear velocity of extrusion is not highly critical but is suitably from about 0.5 to 5 ft./sec. The pipe is provided with an inlet upstream from the extrusion head into which the coolant is introduced, and a vessel at the downstream end is provided with a mechanical agitator to disperse the extruded strands into the coolant and an outlet from which the resultant polymer slurry flows to the separation means such as a filter, centrifuge or the like. The pipe should have sufficient length to enable the extruded strand substantially to come to thermal equilibrium with the coolant and to complete the precipitation process. The time required to complete the precipitation process by cooling a solution according to the process of this invention is proportional to the square of the thickness of the strand. The rate of cooling together with the linear velocity of the strand determines the length of the pipe containing coolant through which the strand must pass in order to complete the precipitation process. Accordingly the strand preferably should be less than about 1″, and more preferably less than about ¼″ in its least dimension in order to achieve complete precipitation in a pipe having reasonable dimensions and using a reasonable rate of operation. Part of the coolant may be recovered by an outlet in the pipe prior to disintegration of the extruded strands, and the ratio of coolant to extrudate adjusted so that the resultant slurry after disintegration of the strand contains up to about 5% by weight of solids. This level of solid content is by no means critical, but has been found to be particularly suitable for rapid and effective filtration. An alternative method of achieving the preferred solids concentration for effective filtration when a large volume of coolant is employed is to recycle part of the resultant slurry through the cooling column.

It is highly desirable that the rate of cooling of the extrudate strand should be relatively slow. Generally, the rate of cooling is greater the greater the least thickness of the extruded strand, which may be conveniently from about ¹⁄₃₂″ to 1″ and preferably not more than ¼″ in dimension. Greater thicknesses of extruded strand require excessive cooling times as described hereinabove.

The cooling rate is determined by the temperature of the coolant, the slowest rate being attained with temperatures close to the precipitation temperature. The coolant temperature should therefore be from about 5 to about 40° C. below the precipitation temperature, although it will be realized that lower coolant temperatures are operable.

The pipe through which the extrudate strand and the coolant flows during the cooling process may be horizontal, vertical (with extrusion upwards or downwards) or in an inclined position. The pipe may be of non-uniform section in order to obtain differing flow rates in differing parts of the tube; likewise the pipe may be bent in a curve.

When the coolant and the solvent employed to form the extrudate solution have substantially the same composition, the hot extrudate generally has a density which is less than that of the coolant and the strand tends to float upwards. When the strand has cooled, and has assumed a solid texture, the density is generally greater than that of the coolant and the strand tends to sink in the coolant under the influence of gravity. For this reason it is preferred, when the solvent and coolant are the same, to have the pipe in the form of an inverted U, the extrusion being conducted upwardly into one leg of the U, so that the flow of the polymer strand is assisted by the density difference.

When the cooling agent has a substantially greater density than the extrudate, the pipe can be in a horizontal position, and can be only partially filled with the coolant liquid so that the extrudate strand floats along the upper surface of the liquid.

The invention has been described most particularly with respect to polypropylene, for which it is especially valuable, but it will be realized that it is also valuable for the recovery of other plastics, and particularly crystalline olefin polymers from solution, including but not limited to polyethylene, particularly high density polyethylene such as Type III of ASTM specification D–1248–60T, polybutene-1, polypentene-1, poly-4-methyl pentene-1, and like.

This invention is further illustrated by the following examples, which are not, however, intended to fully delineate the scope of this discovery.

EXAMPLE 1

A precipitation apparatus consisting of a vertical glass tube 1½ inches in diameter was fitted at the top with a small inverted U tube leading to a collecting vessel. A glass steam-jacketed nozzle approximately ⅛" internal diameter was placed at the bottom of the vertical tube directed upwardly. Below the nozzle, the vertical tube was fitted with an inlet for the coolant solution, which was recycled from the collecting vessel after filtration.

A 10% by weight solution of a commercial high density polyethylene in n-decane was pumped through the nozzle at a temperature of about 160° C. into a coolant mixture of n-heptane and n-butanol, the composition of which had been adjusted to approximately the density of n-decane. The coolant was maintained at about 45° C. by a heat exchanger in the recycle line. The extrudate congealed to a white, opaque strand, indicating that precipitation had taken place, and thereafter dispersed in the coolant solution. Microscopic examination of the precipitate showed it to be dendritic in character.

The experiment was repeated using a coolant temperature of 70° C. and a solution of the same polyethylene, but having a concentration of 15% by weight in the n-decane solvent. Again the strand dispersed in the coolant after precipitation had occurred, but the resultant polymer particles were granular in character and could be filtered more readily than the dendritic precipitate formed in the first experiment.

EXAMPLE 2

A precipitation apparatus was constructed in the form of an inverted U from 3 inch diameter steel pipe, the vertical limbs of which were 24 ft. in length. At the bottom of one limb was provided an inlet for the introduction of the coolant. Approximately one foot above the bottom of the coolant inlet was placed an inlet constructed of polytetrafluoroethylene, the inlet having a slit exit 1/16"×1.5" directed downstream (i.e. in an upward direction) from the coolant inlet. The other limb terminated in an agitator chamber consisting of a pipe 3" in diameter set at right angles to the limb of the U tube. Within this chamber was an axial shaft bed through a sealed bearing at the end of the chamber, and having five 2-bladed paddles, each ¼"×1½" in size. The shaft and the attached paddles were driven by an electric motor at about 600 r.p.m. At the end of the disintegration chamber remote from the entrance of the U tube was an outlet for removal of the polymer slurry. The apparatus was fitted with glass windows adjacent to the extrusion inlet and to the agitator to provide for visual observation of the contents of the system. In order to provide for operation above the boiling point of the solvents, the entire system could be pressurized up to 100 p.s.i.g.

The greater part of the slurry from the agitator was cooled and pumped through a recycle loop back to the inlet, together with make-up coolant. The remainder of the slurry from the agitator was piped to a filtration unit. The proportion of recycle slurry was adjusted to provide about 5% solids in the slurry at the agitator exit.

In one run the polymer employed in the feed solution consisted of a crude, as synthesized, partially crystalline polypropylene having a melt index of 1.2 and containing 16% by weight of atactic polypropylene extractable with boiling benzene. Thirty parts by weight of the polymer were dissolved in 28 parts of n-heptane and 42 parts of n-butanol. The polymer solution was injected into the precipitation apparatus through the slit die at a rate of 25 lbs./hr. and at a temperature of 150° C. i.e. at a velocity of about 0.27 ft./sec. The column coolant consisted of a slurry of precipitated polypropylene in n-hexane and butanol. The coolant was maintained at 70° C. and at a flow rate of 4000 to 5000 lbs./hr. i.e. at a velocity of 0.5 ft./sec. The precipitated strands were dispersed into the slurry in the agitator. The slurry from the outlet to the agitator was fed to a filter at the rate of 155 lbs./hr., and make-up coolant consisting of a mixture of 65 parts by weight of butanol and 35 parts by weight of n-heptane was added to the loop through which the slurry was pumped to the coolant inlet.

Under these conditions the system operated over extended periods without undue difficulty. The unwashed filter cake of crystalline polypropylene was found to contain about 5% by weight of atactic polypropylene soluble in boiling benzene.

Many modifications of this process may be made within the scope of this invention. Thus a number of strands may be injected into a moving column of coolant simultaneously. Since the effect of shear action is of most consequence when the strands are still unprecipitated on the exterior, the extruded ribbon can be collected in large vessels after cooling the exterior surface, neglecting the effect of shear, in order to obtain a sufficiently large residence time to accomplish complete precipitation without the use of unduly lengthy columns. Other modifications will also be apparent to those skilled in the art.

What is claimed is:

1. A method for separating partially crystalline olefin polymers from solution which comprises extruding a solution of an olefin polymer having a concentration in the range between 10 and 50% by weight and having a viscosity of at least 2,000 centipoises, at a temperature above the solution temperature, in the form of strands, cocurrently into a stream of a liquid coolant, said coolant having a temperature below the precipitation temperature, the linear velocity of the said coolant being from about 1 to about 4 times the linear velocity of extrusion of the said solution, continuing to pass the said strands in contact with the said coolant until precipitation is substantially complete, disintegrating the said strands to form a slurry containing solid olefin polymer particles, and thereafter separating the said particles.

2. Process of claim 1 wherein the extruded strands of the said solution are from 1/32 to 1 inch in thickness.

3. Process of claim 2 wherein the said liquid coolant is miscible with the said solution of olefin polymer.

4. Process of claim 3 wherein the solvent employed to form the said solution of olefin polymer and the said liquid coolant consist essentially of a mixture of a hydrocarbon having from 6–10 carbon atoms and from 30 to 65 mole percent of an aliphatic alcohol containing from 3–8 carbon atoms.

References Cited

UNITED STATES PATENTS

| 2,210,116 | 8/1940 | Dreyfus | 264—180 |
| 3,046,606 | 7/1962 | Carter | 264—141 |
| 3,068,527 | 12/1962 | Morgan | 264—180 |
| 3,070,835 | 1/1963 | Alsys | 264—142 |
| 3,207,818 | 9/1965 | Marshall | 264—142 |

FOREIGN PATENTS 814,803 6/1959 Great Britain.

ROBERT F. WHITE, *Primary Examiner.*

S. LANDSMAN, *Assistant Examiner.*